ELECTRON BEAM OSCILLATOR

Original Filed Jan. 22, 1938 6 Sheets-Sheet 1

INVENTORS
WILLIAM W. HANSEN
RUSSELL H. VARIAN
BY Herbert H. Thompson
their ATTORNEY.

ELECTRON BEAM OSCILLATOR

Original Filed Jan. 22, 1938 6 Sheets-Sheet 2

INVENTORS
WILLIAM W. HANSEN
RUSSELL H. VARIAN
BY Herbert H. Thompson
ATTORNEY

INVENTORS
WILLIAM W. HANSEN
RUSSELL H. VARIAN
BY Herbert H. Thompson
ATTORNEY.

ELECTRON BEAM OSCILLATOR

Original Filed Jan. 22, 1938 6 Sheets-Sheet 4

INVENTORS
WILLIAM W. HANSEN
RUSSELL H. VARIAN
BY Herbert H. Thompson
ATTORNEY.

ELECTRON BEAM OSCILLATOR

Original Filed Jan. 22, 1938 6 Sheets-Sheet 5

INVENTORS
WILLIAM W. HANSEN
RUSSELL H. VARIAN
BY Herbert H. Thompson
their ATTORNEY.

ELECTRON BEAM OSCILLATOR

Original Filed Jan. 22, 1938 6 Sheets-Sheet 6

INVENTORS
WILLIAM W. HANSEN
RUSSELL H. VARIAN
BY Herbert H. Thompson
their ATTORNEY.

Reissued May 30, 1950 Re. 23,234

UNITED STATES PATENT OFFICE 23,234

ELECTRON BEAM OSCILLATOR

William W. Hansen and Russell H. Varian, Palo Alto, Calif., assignors to Board of Trustees of the Leland Stanford Junior University, Stanford University, Calif., a corporation of California Original No. 2,269,456, dated January 13, 1942, Serial No. 186,316, January 22, 1938. Application for reissue October 26, 1948, Serial No. 56,622

12 Claims. (Cl. 315—5)

Matter enclosed in heavy brackets [ ] appears in the original patent but forms no part of this reissue specification; matter printed in italics indicates the additions made by reissue

The present invention relates, generally, to electrical converters or oscillators, and the invention more particularly is concerned with the conversion of the energy of a unidirectional current into the energy of an alternating electromagnetic field. Its field of application is principally in the region of frequencies of $10^8$ cycles per second and higher. It is related to the earlier inventions disclosed in copending applications: Ser. No. 92,787, filed July 27, 1936, for "High efficiency resonant circuit," W. W. Hansen, Patent No. 2,190,712, and Ser. No. 168,355, filed October 11, 1937, for "Electrical converter," R. H. Varian, now Patent No. 2,242,275.

In Patent No. 2,190,712 for "High efficiency resonant circuit," there is described a resonant circuit characterized by an electromagnetic field bounded by the conducting surfaces of a substantially closed non-radiating container. In this circuit the contained field appears as sustained standing waves. This is disclosed also in subsequent copending applications: Ser. No. 185,382, filed January 17, 1938, *now U. S. Patent 2,415,094*, for "Radio measurement of distances and velocities," W. W. Hansen and R. H. Varian, Ser. No. 193,268, filed March 1, 1938, *now U. S. Patent 2,272,165*, "Electrical converter," W. W. Hansen, R. H. Varian, and L. M. Applegate, and Ser. No. 201,898, filed April 14, 1938, *now U. S. Patent 2,280,824*, "Radio transmission and reception," W. W. Hansen and R. H. Varian.

In Patent No. 2,242,275, it is shown how to produce oscillations using an electron beam projected through two space-resonant devices of the above-described character, the combination being referred to as a "klystron." A "klystron," in preferred form, is an electrical converter and/or amplifier composed of two or more space-resonant devices excited and coupled by a beam of electrons projected through the electromagnetic fields contained in the space-resonant devices. We have also referred to the first space-resonant device in a "klystron" as a "buncher" and the second as a "catcher." In the "buncher," the electrons are alternately accelerated and decelerated at the frequency of oscillation of the field of the "buncher," and in the "catcher," the energy of the bunched electron beam is converted into electromagnetic-field energy. We shall use these terms in our present disclosure.

The principal object of the present invention is to provide a novel electrical converter employing a single space-resonant device and serving as an efficient generator of ultra-high-frequency alternating currents and being capable of delivering large power.

Another object of the present invention lies in the provision of a novel electrical converter of the above character employing a single enclosed resonant circuit through which a beam of electrons is adapted to be directed to establish a standing electromagnetic field therein, the electrons moving preferably parallel to the electric vector of the field, which vector preferably varies in intensity throughout the length of the circuit to effect highly efficient operation, the dimension of said circuit along the axis of said beam being such as to enable speeded up electrons to overtake slowed down electrons and hence produce groups which are allowed to leave the circuit at lowered velocities, thereby giving up energy to the resonant circuit field and maintaining the same in oscillation.

Still another object of the present invention is to provide a novel electrical converter of the above character having such physical configuration as to enable the maximum possible absorption of energy from the electron stream for maintaining the converter in operation and for supplying any desired load.

Other objects and advantages will become apparent from the specification, taken in connection with the accompanying drawings wherein the invention is embodied in concrete form.

A distinction between the "klystron" and the present invention is that in the "klystron" at least two separate electromagnetic fields are employed, one for "bunching" an electron beam, that is, for changing the electron velocities, and one for "catching," that is, taking energy from the beam; while in the present invention we use a single electromagnetic field for buncher and catcher and the space in between. Because of this characteristic, we call our present invention the "monotron," that is, a "single thing." The name is properly used as a noun modifier such as in the expressions "monotron oscillator," "monotron detector," et cetera. In the "klystron" oscillator, the two space-resonant devices are bilaterally coupled together by inductive loops or other means. In the monotron, only one space-resonant device is required, inasmuch as only one electromagnetic field is used. This arrangement is of course simpler than the earlier one, that of the "klystron," but in some ways it is not so flexible. In general the modes of application and uses of the "klystron" are applicable to the monotron.

The monotron is very simple in its physical embodiment, as will be shown, but the mathematical considerations underlying its invention and reduction to practice are comparatively complex. Accordingly, in the present disclosure we will set forth the principal mathematical relationships involved in order that those skilled in this phase of the art may have a basis upon which to conduct theoretical investigation of our invention. However, a disclosure sufficient for the practical use of our invention would not require more than a few diagrams and a simple explanation.

Figure 1A:
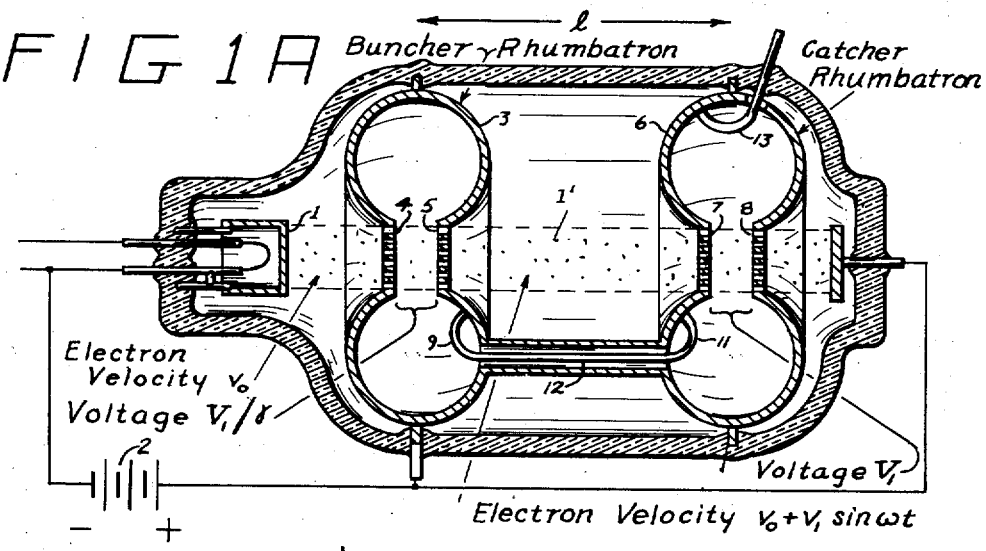
Fig. 1A is a diagrammatic representation of a "klystron."
Figure 1B:
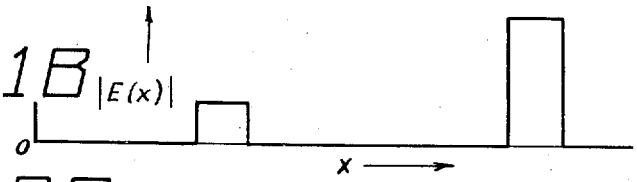
Fig. 1B is a graph of certain electric fields relating to Figure 1A.

As the preliminary part of the mathematical description of our present invention, we will review some of the theory of the klystron. For this we begin with Figure 1A, which shows a klystron oscillator in which 1 is an emitter of electrons, 2 an accelerating battery, 3 a space-resonant device with a pair of spaced grids 4 and 5, 6 a second space-resonant device with a grid 7 and a grid or plate 8 spaced therefrom, 9 and 11 are coupling loops connected by a pair of conductors 12, preferably in the form of a concentric line, and 13 is a coupling loop for output. Briefly, the operation is as follows: A beam 1′ of electrons is projected from the emitter 1 through the grids 4 and 5 where positive and negative accelerations of electrons in the beam occur alternately at the natural frequency of the system. The electrons leaving grid 5 travel toward grid 7 at differing velocities so some electrons gain on others with the result that at grid 7 the electrons arrive in more or less clearly defined surges, or groups or bunches, in which individual electrons have velocities varying over a considerable range. Entering the field between grids 7 and 8 the bunches of electrons periodically deliver pulses of energy to the electromagnetic field in the space-resonant device 6 at its natural frequency, thus exciting and maintaining it in a state of oscillation. Energy for bunching is transferred from the catcher space-resonant device 6 to the buncher 3 by the coupling loops 9 and 11 and line 12. The oscillations are started by small departures from uniformity in velocity or density of the electrons of the beam such as might be accounted for by the shot effect in the electron beam. Energy is adapted to be taken for load purposes from the catcher space-resonant device 6 by the coupling loop 13 or equivalent means, such as capacitive elements.

We will not proceed with the mathematical review of the klystron. Let electrons of velocity $v_0$ from the emitter 1 enter the field between grids 4 and 5. This field is an alternating one and is such that the value of the integral of E from grid 4 to grid 5 is $V_1/\gamma \sin \omega t$, where $V_1$ is the maximum cyclic value of the voltage between grids 7 and 8, $\gamma$ is the ratio of the maximum cyclic value of the voltage between grids 7 and 8 to the maximum cyclic value of the voltage between grids 4 and 5, $V_1/\gamma$ is the steady state maximum value of voltage between grids 4 and 5, $\omega$ is then $2\pi f$ where f is the frequency in cycles per second, and t is time in seconds. Let it be assumed that $V_1/\gamma$ is much less than $V_0$ where $V_0$ is the voltage of the electrons, that is, substantially the voltage V of the battery 2. The electron velocity $v_0$ is that corresponding to the acceleration voltage $V_0$. The distance between grids 4 and 5 is made, for ease in explanation, small compared with the distance traversed by an electron of velocity $v_0$ in one half cycle. An electron with velocity $v_0$ that traverses the field between grids 4 and 5 falls through a voltage $V_1/\gamma \sin \omega t$ so that its velocity is changed, say to $v_0+v_1 \sin \omega t$. Note that $\sin \omega t$ is negative half the time of a period.

To examine the bunching process, consider an electron arriving at grid 7 at a time t″. Say that it left the grid 5 at time t′; then the following relation applies:

$$(1) \quad t''=t'+\frac{l}{v_0+v_1 \sin \omega t'} \cong t'+\frac{l}{v_0}-\frac{lv_1}{v_0^2} \sin \omega t'$$

where l is the distance from grid 5 to grid 7. Differentiating, we find that if a uniform stream of $N_0$ electrons per second leaves grid 5 the density after traversing a distance l will be $$\frac{N_0}{1-\frac{l\omega v_1}{v_0^2} \cos \omega t'}$$

Now we seek to express this a Fourier series, knowing that if we succeed, the power put into the circuit associated with the grids 7 and 8 can be computed in terms of the voltage across the grids 7 and 8 and the value of the appropriate Fourier coefficient in the series for the current.

Thus we write $$(2) \quad \frac{N_0}{1-k \cos \omega t'}=\Sigma\, a_n \cos n(\omega t''+b_n)$$

where $$k=\frac{l\omega v_1}{v_0^2}$$

and $b_n$ is a phase shift, and we inquire as to the values of $a_n$.

$$(3) \quad a_n=\frac{\omega}{\pi}N_0\int_0^{\omega t'/2\pi} \frac{\cos n(\omega t''+b_n)}{1-k \cos \omega t'}dt''$$

It is advantageous to do the integration in terms of t′ rather than t″ so we change the variables as follows:

$$\omega t'' + b_n = \omega t' - k \sin \omega t' + \frac{\omega l}{v_0} + b_n$$

It will be seen presently that $b_n$ should be selected to make the constants on the right add to zero. This is physically reasonable since the phase shift b must be determined by the transit time $l/v_0$. Then $\omega t'' + b_n = \omega t' - k \sin \omega t'$ and $dt'' = dt' (1 - k \cos \omega t')$.

$$(4) \quad a_n = N_0 \frac{\omega}{\pi} \int \frac{\cos n(\omega t' - k \sin \omega t')}{1 - k \cos \omega t'} (1 - k \cos \omega t') dt'$$

$$= \frac{N_0}{\pi} \int \cos n(\omega t' - k \sin \omega t') d(\omega t')$$

$$= N_0 2 J_n(nk)$$

where $J_n$ is the Bessel function of order n. The problem is now essentially solved.

To see how this applies in practice let us select a particular case in which a current of electrons $I = N_0 e$ passes through grids 4 and 5 and find how much power is transferred to the circuit connected to grids 7 and 8. Suppose the voltage between grids 7 and 8 is kept at a value just sufficient to stop the slowest electrons, that is, $V_0 - V_1/\gamma$. Since we have already made $V_1/\gamma$ very small compared with $V_0$, let us simplify the formulae by taking the voltage across grids 7 and 8 to be $V_0$. Then the power into the catcher circuit 6 is just $V_0 I J_1(k)$. This assumes that the second circuit is running at the fundamental frequency. If it were on the nth harmonic $J_1(k)$ would be replaced by $J_n(nk)$. Since the power expended in accelerating the electrons is $V_0 I$ the efficiency is $J_1(k)$. When it is possible the arrangement is designed or adjusted so k will give the maximum efficiency. The best value of k is found from tables to be 1.84 and the corresponding value of $J_1$ is 0.582. We have referred to the deceleration of electrons in the catching field as if the action were complete, but a full understanding of the mathematics will indicate that deceleration of all electrons is not practically accomplished. Actually even under supposed optimum adjustments there may be a few electrons accelerated in the catching field, although most of them will be decelerated as is desired.

The above calculations can also be used to determine the mutual conductance of the klystron used as an amplifier. Thus, supposing k is much less than 1.84, we can approximate $J_1(k)$ as k/2 and so find for the ratio of first harmonic electron currents to buncher voltage $\pi l I / \beta \lambda V_0$ with $\beta = v_0 c$. This increases indefinitely with l, apparently, but actually an effect due to electron space charge which we call "debunching" occurs which prevents utilizing very large values of l. This effect which is the result of mutual repulsion of the electrons when crowded together in the beam tends to limit the sharpness and density of the bunches as the distance traversed increases. However, with moderate values of l useful values of mutual conductance can be attained.

Finally, as to the klystron, we may note that there are three independent parameters adjustable in operation and two that are determined in the design. The first three are: (1) the initial velocity $v_0$ of the electrons; (2) the number per second $N_0$ of the electrons; and (3) the ratio $\gamma$ of the voltage between grids 7 and 8 to the voltage between grids 4 and 5. The two design parameters are: (1) the bunching distance l; and (2) the effective shunt impedance of the catcher space-resonant device, i. e., the quotient obtained by dividing the alternating current voltage generated within the catcher-resonator 6 between grids 7 and 8 thereof, by the alternating current component of the electron stream current passing through this resonator. The latter parameter is often made variable, but it simplifies matters and sacrifices no essential generality to consider it fixed.

Figure 2A:
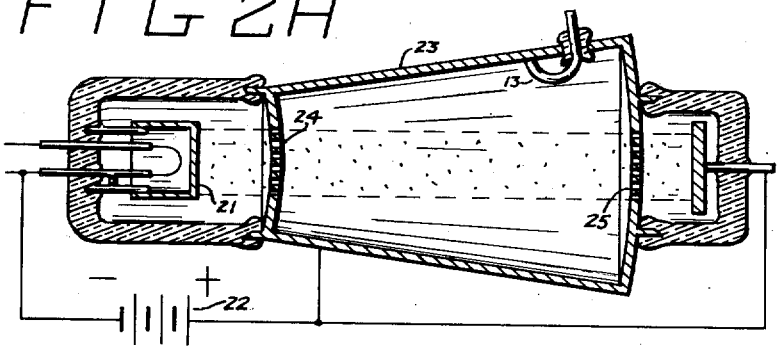
Fig. 2A is a diagrammatic representation of our present invention in a form suitable for purposes of explanation.
Figure 2B:
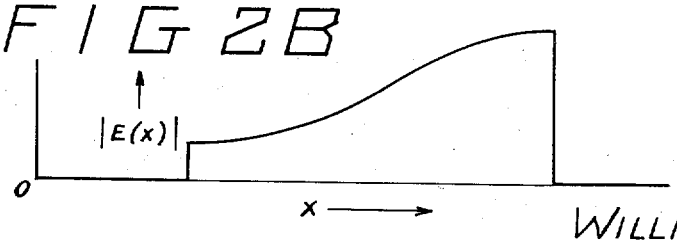
Fig. 2B is a graph of certain electric fields relating to Figure 2A.

We will not proceed to the description of the monotron, one form of which is shown in Fig. 2A, in which 21 is an emitter of electrons, 22 an accelerating potential battery, and 23 an evacuated shell constituting a space-resonant device of special shape. The shell 23 has a bounding surface including apertured grids 24 and 25 in oppositely disposed end faces of the space-resonant device 23. By comparison with the klystron of Fig. 1A, it will be seen that the two space-resonant devices 3 and 6 and the associated coupling loops 9 and 11 have been replaced by a single internally resonant conducting hollow body 23 in Fig. 2A. The electron stream from the emitter 21 has a substantially uniform distribution in time outside the resonator 23. In operation, the space-resonant device 23 contains a confined resonant oscillating electromagnetic field with a substantial magnetic field component and having standing waves. The electric field component extends along the axis of device 23, i. e., from the center of grid 24 to the center of grid 25, and its magnitude is $E(x) \cos \omega t$ with E as represented in Fig. 2B, in which E is the electric field strength within container 23 along the axis of the electric field component and also along the axis of the electron beam projected through member 23, x being the distance from grid 24 toward grid 25. The cavity resonator 23 may also be constructed so as to support a direct current field, but this possibility will be neglected for the moment. As will develop presently, the exact shape of the curve for E(x) along the path of the beam is unimportant—all we need to know when carrying out a sample calculation is that it has no discontinuities, i. e. sudden changes in the value of the electric field component and this is true as long as there are no conductors on the axis inside the space-resonant device. Actually the device will operate with discontinuities in the electric field vector, such as those caused by conductors, but such forms of the invention require more complicated calculations which will not be given here. A distinction between the arrangement shown in Fig. 1A and that shown in Fig. 2A is that in the first the ratio of the voltage drops in the electric vector extending between the grids 4 and 5 and between grids 7 and 8 was adjustable while in the second a corresponding ratio exists in the field strengths adjacent the grids 24 and 25, but in the case of Fig. 2A this ratio is determined by the design. Thus the three adjustable parameters, i. e. accelerating voltage, back-coupling and current, in the "klystron" are reduced to two, i. e. accelerating voltage and current, in the monotron and the number dependent upon the design are increased by one in the monotron. Thus, the simplification of design sacrifices the adjustability of one parameter.

In the monotron, as in the "klystron," a beam of electrons from the emitter 21 is accelerated by the battery 22. The electrons enter through the grid 24 as they entered through the grid 4 in the klystron. For purposes of illustration, reference may be made to Figs. 3A to 3F, wherein the actions of two representative electrons of the beam are traced in their motion through the klystron or monotron, as the case may be. These two electrons will afford a picture of what happens to the remaining electrons of the beam. In Fig. 3E, corresponding to the operation of the "klystron" structure of Fig. 1A, one electron is represented by a solid line while the other is represented by a dotted line, these lines having the same slope, as indicated at 90 and 91, respectively, during that portion of the travel of the electrons before they enter the space between grids 4 and 5, being thus indicative of the fact that both electrons have the same velocity during this initial period. The electron represented by the dotted line 90, leaving cathode 1 earlier, reaches the interspace between grids 4 and 5 first, and assuming that the instantaneous electric field in the interspace opposes this electron, its movement will be retarded, as represented by the dotted line 92. The electron represented by the solid line 91 reaches the interspace a half-cycle later when the field therein is reversed, and hence the field accelerates this electron, as represented by the full line 93. After leaving the grid 5 and by the time the electrons reach the interspace between the grids 7 and 8, the speeded-up electron represented by the solid line 93 has overtaken at 95 the slowed-up electron, represented by the dotted line 92. The portions of the paths of these electrons between the grids 4 and 5 are omitted for purposes of simplification.

There two electrons are representative of a group that is thus formed upon entering the interspace between the grids 7 and 8. Within this interspace the group or bunch of electrons is adapted to be subjected to an alternating electric field. If the phase of this field is such as to oppose the electron bunches, the electrons of the bunches will be slowed down, and the kinetic energy thus lost by the electrons will evidently then be transferred to this electric field. One half-cycle later, the electric field will be directed so as to speed up electrons passing between grids 7 and 8, but at this time there are fewer electrons passing between these grids since this portion of the electron beam has been rarefied due to the bunching operation, with the result that the field does not lose as much energy to these fewer electrons as it gained from the relatively greater number of bunched electrons passing through during the previous half-cycle, and hence, because of the net energy supplied to them, the oscillations in resonant circuit member of Fig. 1A will tend to increase in amplitude. Consequently, all that is required initially is a very small transient oscillation, no matter how initiated, in the right phase in member 6 and it will grow to a large value when thus supplied with energy from the bunched electrons. The proper coupling, provided by line 12 and loops 9 and 11, between circuit members 3 and 6 serves to cause the beam to be bunched when it reaches member 6, whereby alternating current energy may be extracted therefrom. Thus, the device of Fig. 1A becomes a self-excited oscillator.

Figure 3A:
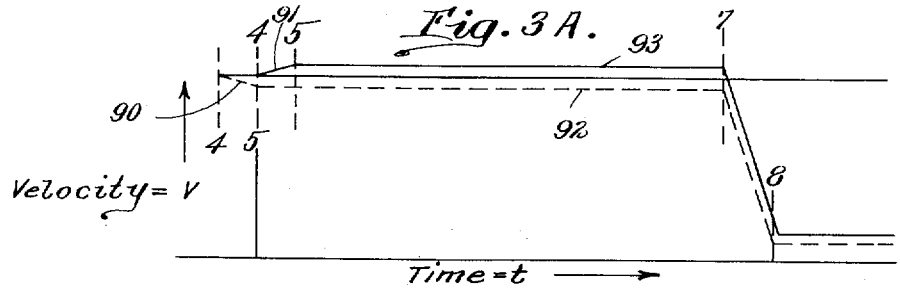
Fig. 3A is a graph of electron velocities plotted with time (t) as abscissa relating to Figure 1A.
Figure 3B:
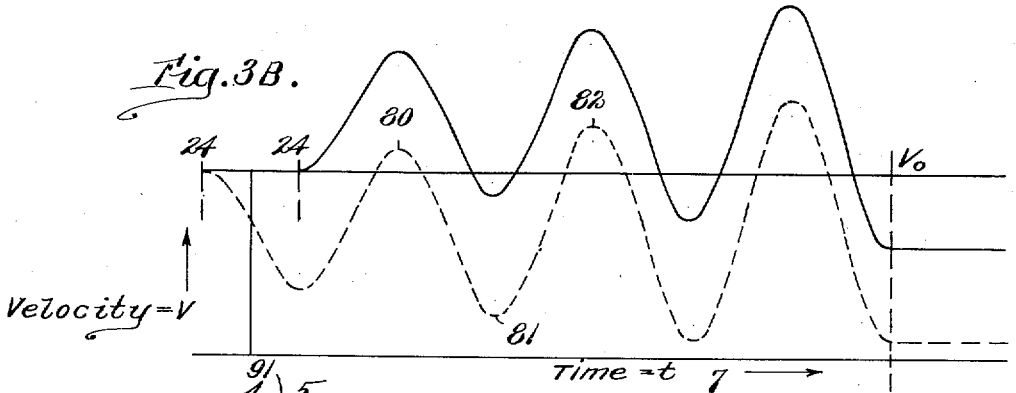
Fig. 3B is a graph of electron velocities plotted with time (t) as abscissa relating to Figure 2A.

In Fig. 3A, the velocities of the two electrons are plotted as a function of time. The electron illustrated by the dotted line 90 enters the interspace between the grids 4 and 5 when the field opposes its motion and has its velocity v reduced as shown by the downward slope of this dotted line 90, and thereafter it travels more slowly. The electron illustrated by the solid line enters the interspace 4—5 later, when the field aids its motion, and hence increases in velocity as shown by the upward slope of this solid line 91. This electron, represented by the full line 91, although leaving the interspace 4—5 later than the electron represented by the dotted line 90, nevertheless overtakes the latter at the time it reaches the interspace between the grids 7 and 8. Both electrons, after traveling between the grids 5 and 7, as represented at 92 and 93, respectively, receive substantially a reduction in velocity in passing through the opposing field extending between the grids 7 and 8, which may be very large relative to the changes in velocity caused by the bunching operation. This is but another way of stating that a large proportion of the original energy given to the electrons by the accelerating field of the energy source comprising the battery 2 may be transferred to the oscillatory field in the catcher resonator 6.

Figure 3C:
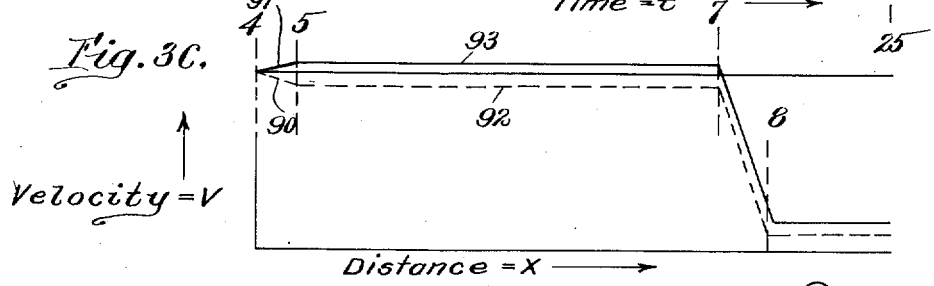
Fig. 3C is a graph of electron velocities plotted with distance (x) as abscissa relating to Figure 1A.
Figure 3D:
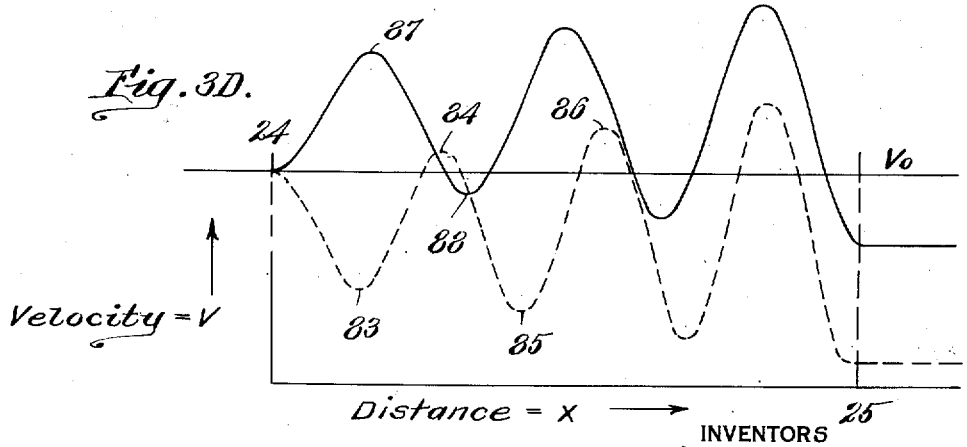
Fig. 3D is a graph of electron velocities plotted with distance (x) as abscissa relating to Figure 2A.
Figure 3E:
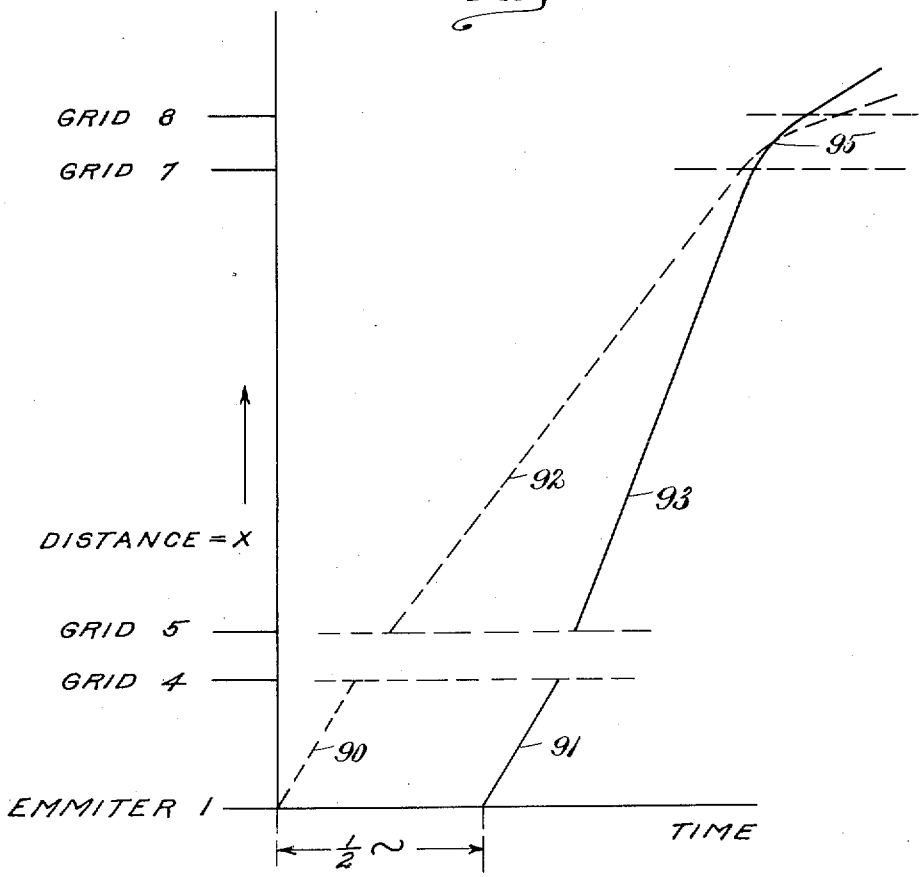
Fig. 3E is a graph of distances traversed by certain electrons plotted with time (t) as abscissa relating to Figure 1A.
Figure 3F:
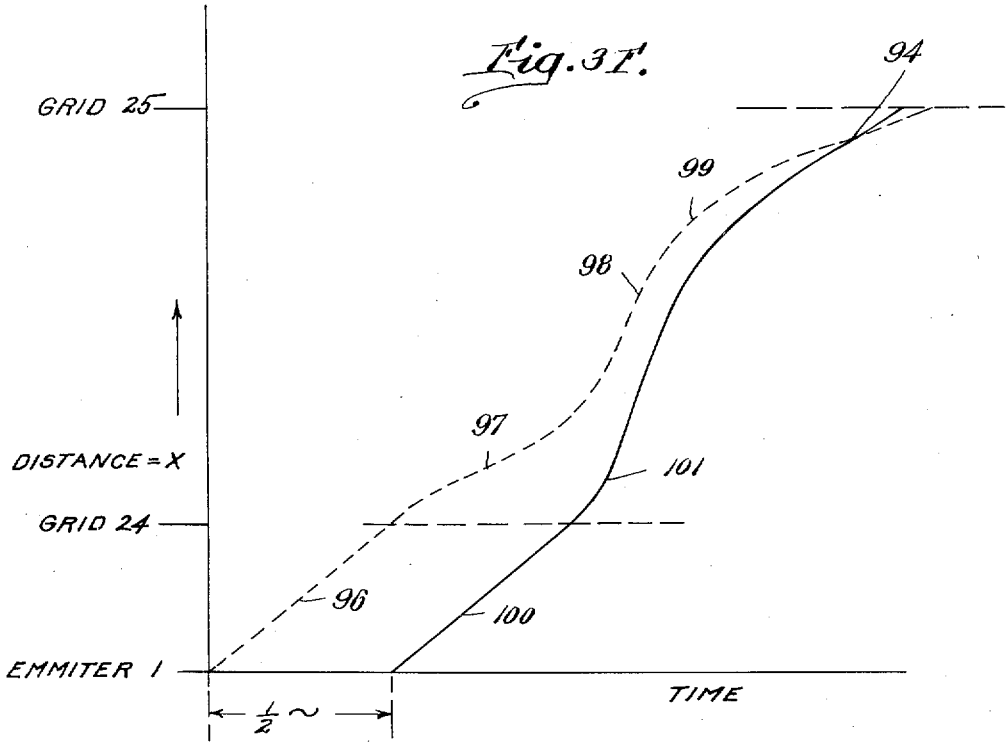
Fig. 3F is a graph of distances traversed by certain electrons plotted with time (t) as abscissa relating to Figure 2A.

In Fig. 3F, corresponding to the operation of the monotron structure of Fig. 2A, it will at present be assumed for purposes of explanation that the alternating electric field extending between the grids 24 and 25 is uniform in space. Then, if the electron represented by the dotted line 96 enters the space between the grids 24 and 25 with velocity $v_0$ at a time when the field within this space is zero and about to increase in a direction to oppose the motion of the electron, the latter, in its further travel in the field, will be slowed down for the first half-cycle of oscillation of the field, as represented at 97, and will be speeded up, as indicated at 98, in its passage during the second half-cycle, so that at the end of the full cycle, it will have the same velocity at 99 as that with which it entered the space. During the remainder of the time that this electron is in the interspace between the grids 24 and 25, its velocity will be decreased due to the reversal of field so that by the time it leaves the grid 25 its velocity is below that at which it entered the grid 24. Since this electron was initially slowed down upon its entry into the field of resonator 23, its average velocity therein is below that which is possessed at its time of entry, i. e. below $v_0$.

Similar reasoning will show that the electron represented by the solid line 100 entering later and at the beginning of the reverse half-cycle will have an average velocity within the space between the grids 24 and 25 that is greater than $v_0$, as represented at 101. Thus, it will be clear that electrons with higher than average velocity following electrons with less than average velocity will overtake the latter at 94 and form an electron bunch or group similar to the bunch or group found in the "klystron" upon entering the space between the grids 7 and 8 thereof. If, now, this group leaves the electric field through the grid 25 at a time when all the electrons in the bunch have minimum velocities, the fastest electrons of the group will have a velocity of about $v_0$, assuming the electric vector to be of uniform strength for all values of X, whereas the slowest electrons will have a velocity considerably less than this. Though the electrons have both gained energy from and lost energy to the field during their travel therethrough, therefore, the group as a whole, by the time that the electrons have left the field, has delivered energy to this electromagnetic field between the grids 24 and 25. Assuming the energy lost by the electrons as a whole to the field is great enough to maintain the field, that is to supply all losses, and thus to effect bunching of the electrons, the device will act as a self-oscillator.

If desired, the proportions of the resonator 23 and the frequency of the oscillation may be made such that the electron remains for a longer period within the resonator, but the net result will be the same so long as the electrons leave the resonator at reduced velocities. In this event, the second and subsequent cycles will be a repetition of the changes brought about during the first cycle.

In the device of Figs. 2A and 2B, the electric field increases in strength progressively along the axis from the grid 24 toward the grid 25, as described hereinafter in connection with Fig. 6C. The dotted-line electron that loses energy in the first half-cycle, therefore, does not always have its initial energy or less, as in the case just considered. This will be understood from the description hereinafter of Fig. 3B. Nevertheless, it is still true that the electrons that have been slowed down in their first half-cycle in the interspace between the grids 24 and 25, will have less average velocity throughout the remainder of their passage through this space than those that are speeded up in their first half-cycle, and so bunching of course occurs, and with the bunches passing through the grid 25 when they have minimum velocity, they will deliver energy to the field existing between the grids.

It will be recalled that in the initial discussion in which the electric field was considered uniform between the grids 24 and 25, the faster electrons, in passing out of the field through the grid 25, delivered only the energy they had received in the first half-cycle after they entered through the grid 24, and hence these electrons contributed nothing to the energy of the field. If, however, as shown in Fig. 6C, the field increases in strength between the grid 24 and the grid 25, which is true of the structure shown in Fig. 2A, as hereinafter explained, energy may be extracted from both the fast as well as the slow electrons, for all electrons of the bunch will leave through the grid 25 with less energy than that with which they entered the grid 24. Hence, a device in which the field increases along the length of the resonant circuit, as shown, that is, in the direction of the electric field, is a more efficient device than one in which the field is uniform with distance.

Fig. 3C is similar to Fig. 3A except that, instead of the velocity being plotted as a function of time for the electrons in their travel through the oscillator, the velocity is plotted as a function of distance. The dotted line 90 represents an electron that, when entering the space-resonant device 3 at the grid 4 at a certain time, is decelerated. The solid line 91 represents an electron that, when entering the space-resonant device 3 at the grid 4 a half-cycle later, is accelerated. Because the electron represented by the solid line 93 has a higher velocity in the space between the grids 5 and 7 than the electron represented by the dotted line 92, it may reach the grid 7 at the same time as the electron represented by this dotted line 92. If this is the case, both electrons will suffer approximately the same loss in velocity as represented in Fig. 3C by the sharp drop in both the lines between 7 and 8.

Figs. 3B and 3D have the same significance for the monotron as has been previously stated in connection with Figs. 3A and 3C for the "klystron." In Fig. 3B, the earlier entering, dotted-line electron enters through the grid 24 at a time when the field in the resonator 23 is zero and about to oppose the motion of the electron. In the subsequent half-cycle of the resonator 23, therefore, the electron represented by the dotted line is decelerated. In the next half-cycle, the electron is accelerated again and, since the field is increasing in strength from the grid 24 to the grid 25, it will reach a velocity slightly greater than its initial velocity, as shown in Fig. 3B, when it reaches the point 80. Its velocity will then decrease again, reaching a new low velocity at 81, from which the velocity will increase and reach another high at 82. This will continue until the electron leaves the field at the grid 25.

An electron entering the field one-half cycle later will be accelerated during its first half-cycle in the field and will reach a velocity maximum at the time, corresponding to that of 80. It will then lose velocity, reaching a velocity minimum at the time corresponding to the point 81. It will then gain velocity, so as to attain a velocity maximum at the time corresponding to the point 82, and will continue, in a similar manner, until it leaves the grid 25 with reduced velocity, as did the dotted-line electron represented in this Fig. 3B.

In Fig. 3B, it will be noted, the electrons are illustrated as traveling the distance through the resonator 23 in a plurality of cycles, as distinguished from Fig. 3F, in which the electrons travel this distance in something over one cycle.

Fig. 3D is a graph for the monotron corresponding to Fig. 3C for the klystron, the velocities of the electron being plotted as a function of distance. In this case, an electron represented by the dotted line enters through the grid 24 at a time when the field in the monotron is zero and changing in a direction to oppose the motion of the electron. This electron is first slowed down for a half-cycle, so as to reach a minimum velocity at a distance indicated by the point 83. From this point, the electron velocity is increased to a new maximum 84, that is shown somewhat above the initial velocity. In the cycle between the entrance of the electron at the grid 24 and its arrival at the point 84, the average velocity of the electron has been below its initial velocity. This electron then goes through another cycle of velocity changes between the points 84 and 86, through a minimium 85. In this second cycle, the average velocity of the electron is also below the initial velocity. The electron continues in the same manner until it reaches the grid 25, where it leaves the field of the resonator 23 with reduced velocity.

The solid line of Fig. 3D represents an electron that enters the field one-half cycle later than the electron represented by the dotted line, receiving consequently an initial acceleration from the field, and reaching its first maximum velocity at 87. It then loses velocity, reaching a minimum velocity at 88. In this cycle spent in the resonator 23, the average velocity of the electron was above the velocity with which it entered through the grid 24. Since this electron has traveled faster than the electron represented by the dotted line of this Fig. 3D, the distance along the axis separating the successive maxima and minima of velocity is greater than it was by the electron represented by the dotted line. The point 88, representing the minimum velocity of the electron, therefore, is somewhat farther along the x axis than the point 84, representing the maximum velocity of the electron represented by the dotted line of this Fig. 3D. If this electron is followed through the succeeding cycles of its passage through the resonator 23, it will be found that, throughout its passage, it maintains a higher average velocity than the electron represented by the dotted line. The points represented by successive maxima and minima on this curve will progressively get farther and farther ahead of the corresponding points of the dotted-line curve until, when the electron reaches the region immediately in front of the grid 25, it will have gained one-half cycle on the electron represented by the dotted-line curve, and will suffer a large loss of velocity during the half-cycle just before passing through the grid 25, the same as was the case with the electron represented by the dotted-line curve which entered through the grid 24 one-half cycle earlier.

As shown in Fig. 3D, the distance the electrons have traveled is such that the electron represented by the dotted line and that represented by the solid line arrive at the grid 25 approximately at the same instant, at a time when their respective velocities are both at a minimum. They will therefore have delivered energy to the alternating field in the resonator 23.

It is possible, however, by slightly changing the velocities of the electrons in their transit from the grid 24 to the grid 25, to cause the electrons represented by the full-line curve and the dotted-line curve to arrive together at the grid 25 at a time when they will have a maximum, instead of a minimum, velocity. Under these conditions, the electrons of the electron stream will absorb energy from the resonator circuit, instead of delivering energy to it, so that any initial transient oscillations would die out instead of being built up into steady-state oscillations. This change of velocity may be effected by a change of voltage applied between the cathode 21 and the grid 24. By maintaining the field of resonator 23 from some external source the electrons may thus be speeded up.

In the monotron, however, the oscillating electric field contained in the resonator 23 has a component at substantially all points of the field in substantially the direction of travel of the electron stream at certain times and in substantially the opposite direction at other times, during alternate half-cycles. During their travel through the resonator 23, the electrons interact with the field of the resonator at the resonant frequency of the field, so that their speed, in the direction of travel thereof, becomes increased and decreased, and the electrons become thus concentrated in groups in a region of the field prior to reaching the grid 25. Such interaction may be produced by, for example, regulating the time of flight of the stream in the field. The field of the resonator is less intense at its boundary adjacent to the grid 24 than at its boundary adjacent to the grid 25. Increments and decrements of energy of the period of the field are imparted to the electrons both near the grid 24, to cause the electrons to assume periodically varying velocities, and in a subsequent region of the field, but the increments and decrements imparted individually to the electrons in the subsequent region are greater than those imparted to the electrons at the grid 24, with the decrements exceeding the increments. The energy of the groups becomes ultimately absorbed by, or delivered to, the field at the resonant frequency of the field just before the electrons arrive at the grid 25. The electrons thus leave the field of the resonator 23 with less energy than they had when they entered it and electromagnetic resonance is excited and maintained in the field at the resonant frequency of the field to sustain oscillations in the field.

The space-resonant device 23 is of such proportions and the electrons of the stream have such velocities as to establish the before described electromagnetic field therein. Specifically, the dimension of the space-resonant device 23 in the direction of travel of the electron stream and the resonant frequency of the field are so related to the velocity of the electron stream in the space-resonant device 23 as to cause the field to abstract energy from the electron stream.

The portion of the field of the space-resonator device 23 immediately adjacent to the discontinuity or breaking off of the field at the grid 24 and due to the presence thereof performs the same function that the field between the grids 4 and 5 does in the "klystron," and the portion of the field between the inside and the outside of the space-resonant device 23 at the discontinuity immediately adjacent to the grid 25 performs the same function as the field between grids 7 and 8 in the klystron. Of course, the field need not be strictly discontinuous. All that is required is that the field change greatly in a space short compared to the distance traversed by an electron in, say, one cycle. Such a discontinuity is easily produced at a properly designed grid. On the other hand, what is practically a mathematical discontinuity in the field occurs at the conducting surfaces. In the space inside the rhumbatron the field may be of high intensity, whereas inside the conductor at the boundary of the field the intensity is nearly zero. Thus, a discontinuity in field might occur at a grid, or at a conducting surface, and this latter might be a surface where electrons arrive or it might equally well be a surface from which they are emitted. The similarity in the principles of operation will be apparent from the mathematical considerations to be presented.

If an electron of charge $-e$, enters the first grid 24 at time $t=t_0$, with initial velocity $v_0$ determined by battery 22, its velocity at any later time t will be $$v=v_0-\frac{e}{m}\int_{t_0}^{t} E' \cos \omega t' dt' \tag{6}$$

where $E'$ is the value of $E(x)$ where the electron is at time $t'$.

Figure 5:
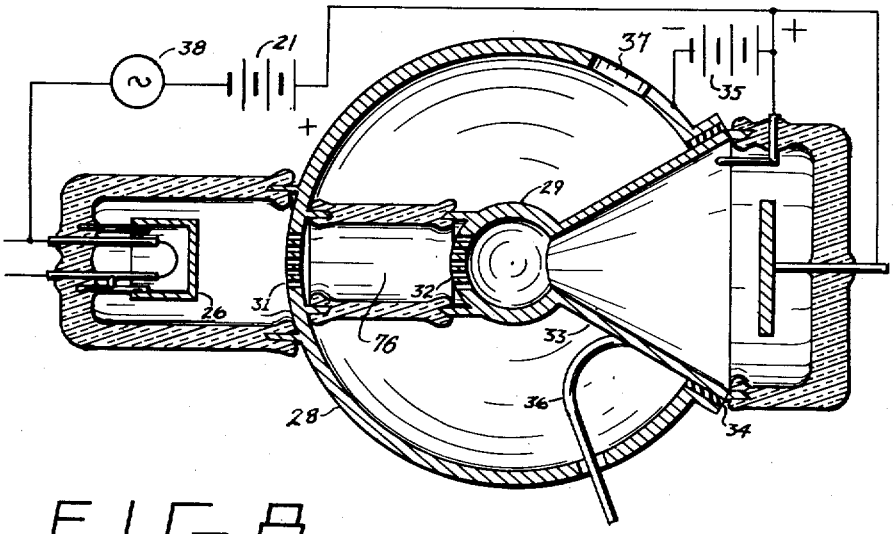
Fig. 5 shows a present preferred form of embodiment of our present invention.
Figure 8:
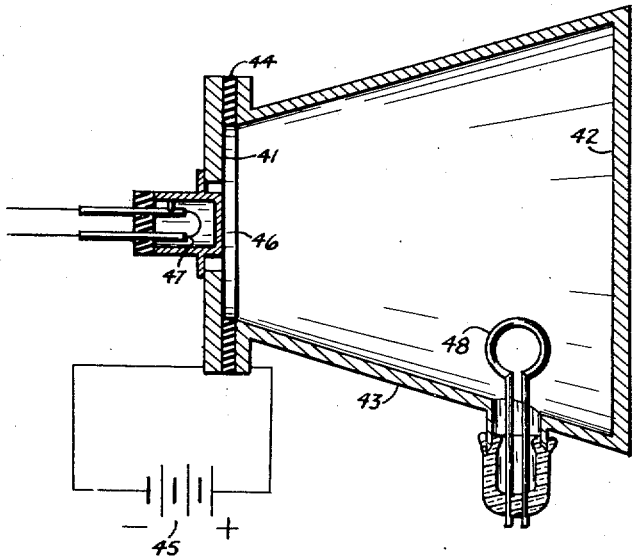
Fig. 8 shows another form of the invention.

Here we could add also a term to account for a unidirectional field that might be superimposed on the oscillating field. For convenience this will be omitted, but it will be apparent from a full understanding of the theory that a unidirectional field should be provided for. The essential parts of our invention are a unidirectional field, an oscillating field and a stream of electrons in the oscillating field. Also, as indicated, the oscillating field must have what amounts to separate field portions adjacent to the two grids 24 and 25 before-mentioned for respectively changing the velocity of the electrons to enable them to become grouped and to absorb the energy of the groups. When the adjustments are right, the electrons can effect transfer of energy from the unidirectional field to the oscillating field. In Fig. 2A, the unidirectional and oscillating fields are shown separate, the unidirectional field being between the cathode 21 and the grid 24, outside the oscillating field, while the oscillating field is confined in the enclosed space between the grids 24 and 25. In Fig. 5, the fields are shown partly superimposed, the unidirectional field produced by batteries 21 and 35 being between the cathode 26 and the grid 32. In Fig. 8, these fields are completely superimposed.

To resume consideration of Equation 6, E′ could, in principle, be found as a function of t′ and the integration performed. Actually, this would be extremely difficult to do except in certain special cases. But the information we really need can be obtained, provided E′ varies slowly enough, by repeated integration by parts. Thus $$(7)\quad v=v_0-\frac{e}{m\omega}\left\{E'\sin\omega t'\Big|_{t'=t_0}^{t'=t}+\frac{dE'}{d(\omega t')}\cos\omega t'\Big|_{t'=t_0}^{t'=t}-\cdots\right\}$$

Averaging v over the transit time through the space-resonant device 23, which usually covers several cycles, the terms due to the upper limits practically drop out. The series of lower-limit terms usually converges rapidly, and in the few cases where it does not, the main results are substantially the same, so we shall drop all terms after the first. The average speed of the electron is therefore $$v_0-\frac{eE(O)}{m\omega}\sin\omega t_0$$

Here E(O) is the peak oscillating field intensity at the entrance grid 24. Thus the average velocity of the electrons depends only on their time of entrance and on the magnitude of the discontinuity in field at x=0, as represented in Fig. 2B. Note that a superimposed unidirectional field would not greatly change the difference in velocity between the fast and slow electrons which is responsible for the bunching process. Therefore the bunching will occur in much the same way in the apparatus of Figure 2A as in that of Figure 1A and the fact that the electron velocity oscillates during the bunching instead of remaining constant as in Figure 1A has no great effect.

Referring again to Figure 3D, it will be seen that if grid 25 is moved back toward the origin it will be encountered by the bunched electrons when they have maximum velocity instead of minimum velocity. Under this condition they would take energy away from the field in the space-resonant device 23 and would tend to stop oscillation. This is the condition for accelerating a stream of electrons in a rhumbatron driven by another electron beam or by an outside oscillator. If the grid 25 is moved back to a point where the bunched electrons have maximum velocity, the stream can be also shifted back if desired by increasing the time of transit between grids 24 and 25 by superimposing a unidirectional field on the alternating field in the space-resonant device 23, or by changing the field in the space between the cathode 21 and the grid 24. This acts on all the electrons alike and changes their transit time without greatly changing their final velocity. The way this field is applied is shown in Figure 5. In the mathematical discussion we will assume that the dimensions of the system are as presupposed in Figs. 3B and 3D.

The structure of Fig. 2A, consisting of the enclosed resonant circuit having entrance and exit grids 24 and 25, will serve as a self-oscillator if, as is well known, at a very small amplitude of oscillation the device manages to extract more energy in oscillatory form from the electron stream than is necessary to maintain the small oscillation we have assumed to exist. That this can be the case in this device is about to be shown. The oscillatory field is set up between grids 24 and 25, and is a continuous function of x, i. e., the distance toward grid 25 from grid 24, but drops substantially discontinuously to zero at these two grids, as is shown in Fig. 2B. Through the grids passes a prescribed stream of electrons going at a velocity determined by the voltage of the battery 22. We intend to compute how much alternating current power is delivered to the rhumbatron 23 and what fraction this is of the direct current power supplied to the electron beam. In performing the calculation we will consider as known any needed characteristic of the rhumbatron or of the field produced by it.

To perform the calculation, we proceed as follows. We take the change in average velocity of the electrons from Equation 7 and insert into Equation 4 getting for the peak value of the first harmonic component of current at the second grid $I_0J^1(k)$ where $I_0$ is the direct current and $k=E(O)/2V$, where V is the accelerating voltage of battery 22. Likewise, the second harmonic is $I_02J_2(2K)$ and it will be found that higher terms are not needed.

Next we need to know the maximum energy an electron can transfer to the field. This will depend on the electron velocity, and on E(l) and is found by using (7) to be $$(8)\quad \frac{\lambda E(l)e}{2\pi mc^2}\left[2\sqrt{\frac{2Ve}{mc^2}}-\frac{\lambda E(l)e}{2\pi mc^2}\right]\frac{mc^2}{2}$$

This equation is correct only when the first term in the bracket is more than twice the second. Physically this corresponds to the requirement that the electron shall not lose more velocity than it has, that is, it must not be turned back. Of course, the apparatus can be run so that some electrons are turned back but for that case these computations do not apply. Also, it has been assumed that the change in average velocity is small compared to that velocity. The apparatus can run well even though this assumption is not fulfilled.

Now we can compute the total power put into the field by using (8), and the Fourier series for the current, and remembering that not all electrons deliver the maximum energy to the field. On the other hand we will assume that the average transit time is such as to make the electrons deliver as much energy as possible. This condition may be met in practice by adjusting the electron voltage or by adjusting various direct current fields in the rhumbatron or by concurrent adjustment of both. The power so computed is to be equated to the power required to keep the rhumbatron in oscillation. We will take this to be $\alpha'E^2(l)$ where $\alpha'$ depends on the losses and loading of the rhumbatron. That is, $\alpha'$ is of dimensions cm.²/ohm and takes into account both the power used in the rhumbatron and the power that may be used usefully. Thus, for any given rhumbatron there exists a minimum $\alpha'$; this may be increased by coupling in a load. We finally find $$(9)\quad \alpha'E^2(l)=I_0\frac{\lambda E(l)}{4\pi}\left[2\sqrt{\frac{2Ve}{mc^2}}J_1\left(\frac{lE(O)}{2V}\right)-\frac{\lambda E(l)e}{4\pi mc^2}\left(1+J_2\left(\frac{lE(O)}{V}\right)\right)\right]$$

This essentially solves the problem. This is seen when we remember that E(O) and E(l) are related through the characteristics of the rhumbatron so that, given V and $I_0$ we have one equation to solve for one unknown, say E(l), and so the power into the rhumbatron and the efficiency of the conversion from a unidirectional current to the energy of an oscillating field.

This is not the preferred form for solution so a simplification is made and a scheme for calculation introduced. This is done by considering E and V as given and solving (9) for $I_0$. The efficiency is also found in terms of E and V and so we can find values of $I_0$, V and efficiency that go together. Changing to more convenient units we find $$(10)\qquad I=\frac{1}{\frac{2\gamma}{\epsilon}\frac{\alpha}{v^{1/2}}J_1\left(\frac{\epsilon}{2\gamma}\right)-\frac{1+J_2\left(\frac{\epsilon}{\gamma}\right)}{8}}$$

$$(11)\qquad \text{Efficiency}=\frac{v}{\alpha^2}\left(\frac{\epsilon}{2\gamma}\right)^2\frac{I}{I}$$

where $$v=\frac{Ve}{mc^2}$$

$$\epsilon=\frac{lE(l)}{V}$$

$$I=\frac{2}{\pi}\frac{\lambda^2}{4\pi\alpha'}\frac{e}{mc^2}I_0$$

$$\gamma=\frac{E(l)}{E(O)}$$

$$\alpha=\frac{\pi l}{\sqrt{2}\gamma\lambda}$$

$$\beta=\sqrt{2v}=\sqrt{\frac{2Ve}{mc^2}}$$

Looking at these formulae we see that if we plot contours of constant efficiency using I and $v/\alpha^2$ as variables then we can use the same chart for all monotrons, individual differences being taken into account in the factors converting I and $v/\alpha^2$ into actual amperes and volts.

We may notice that, for present purposes, three quantities characteristic of the rhumbatron are of importance. These are $\alpha=E(l)/E(O)$, the ratio of exit to entrance field strength, $l/\lambda$, the flight distance of the electrons measured in wave lengths, and $4\pi\ \alpha^1/\lambda^2$, which is a measure of the energy required to maintain the field inside the rhumbatron.

An unnecessarily extended discussion could be based on Equations 10 and 11, and their relation to oscillator efficiency, modulation, et cetera, and with slight additions discussion could be given of regenerative, super-regenerative, and oscillating detectors, et cetera. Most of this will be reserved for the future, however, and at the moment we will only discuss some points of immediate interest.

Figure 4:
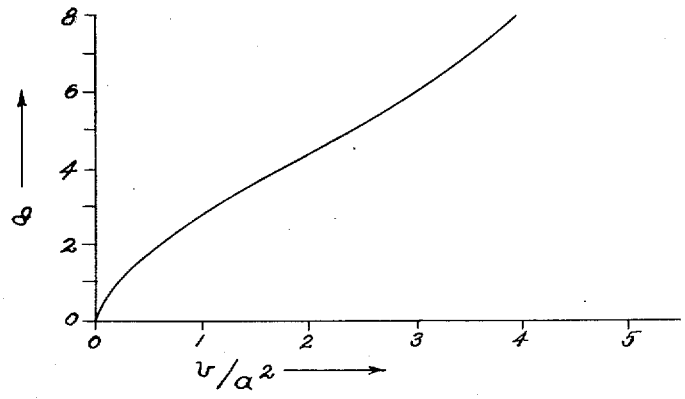
Fig. 4 is a curve showing voltage and current, necessary to start oscillation.

First, we note that the line of zero efficiency bounding the region of oscillations is determined by letting $\epsilon\rightarrow O$ whereupon we find that, just on the edge of oscillation $$(12)\qquad I=\frac{2\sqrt{2}\gamma\lambda}{\pi l}v^{1/2}\left[1-\frac{1}{2\sqrt{2}}\frac{\gamma\lambda}{\pi l}v^{1/2}\right]^{-1}$$

and this equation is plotted in Fig. 4. Using the equivalents stated following Equation 11 this can be expressed as the magnitude of the electron current as follows:

$$I_0=\frac{4\pi\alpha'}{\lambda^2}\frac{mc^2}{e}\frac{\gamma\lambda}{l}\beta\left[1-\frac{1}{4}\frac{\gamma\lambda}{\pi l}\right]^{-1}$$

This, according to our computations, is the minimum electron current that will sustain oscillation in a system to which a given set of dimensional factors will apply. From this equation it is evident that a low value of $\alpha$ makes it easy to start oscillation, though, as we will see in a moment, it may not make it easy to get high efficiency.

We may also write down the conditions for maximum efficiency. These are found to be $$(13)\qquad \frac{\epsilon}{2\gamma}=2.23$$

and $$(14)\qquad \frac{v^{1/2}}{\alpha}=\frac{4J_1\left(\frac{\epsilon}{2\gamma}\right)}{1+J_2\left(\frac{\epsilon}{\gamma}\right)}\frac{2\gamma}{\epsilon}=0.804$$

These combine to give $$(15)\qquad \sqrt{2}v=\beta=0.804\frac{\pi l}{\gamma\lambda}$$

where $$\beta=\frac{V_0}{c}=\sqrt{2v}$$

That is, the most efficient voltage is determined by $1/\lambda$ and $\gamma$. From this we see that in order for the device to run efficiently at a reasonable voltage $$\frac{\gamma\lambda}{l}$$

cannot be too small.

The current that goes with maximum efficiency is easily found to be $$(16)\qquad I=6.5$$

and the energy that may be extracted from the electron beam in a single transit through the resonator 23, as above explained, may be 49 percent.

In computations for the design of the monotron it sometimes happen that E goes to infinity at one of the grids. In this case the following theorem due to Bromwich is of use.

Let F(x) be a function of x which has limited total fluctuation when x=0; let $\gamma$ be a function of $v$ which is such that $v\gamma\rightarrow\infty$ as $v\infty$. Then, if $-1<\mu<1$ $$v^{\mu}\int_0^{\gamma}x^{\mu-1}F(x)\sin vx\,dx\rightarrow F(+o)\Gamma(\mu)\sin\frac{\mu\pi}{2}$$

and, if $O<\mu<1$ the sines may be replaced by cosines throughout. This may be found in Bromwich, Theory of Infinite Series, paragraph 174.

Figure 5 shows the present preferred form of embodiment of our invention. In Figure 5 there is an emitter 26 from which is accelerated a stream of electrons by the voltage of a battery 21. The electrons enter an evacuated portion 76 of the shell 28 and an evacuated internal portion 29. At the entrance of shell 28 there is a grid 31 corresponding to grid 24 in Fig. 2A. The surface 32 which may be either solid or perforated corresponds to the grid 25 in Fig. 2A. Depending upon the relative proportions of the spherical surfaces 28 and 29 shown in Fig. 5, a field inside may be produced that is more concentrated at the surface 32 than at grid 31. This, as is indicated by the computations, is desirable in order to attain high efficiency and ease of starting oscillation with moderate voltages and currents. The general configuration of shell 28 is that of a sphere deformed inwardly to form the part 29, as described hereinafter in connection with Fig. 7C. This is also spherical in general and it is supported on a circular conical section 33. The two sections, 28 and 29, are insulated at an annular joint 34 which has a relatively high capacitance between the two sections. Across the insulation of the joint 34 there is the battery 35 which superimposes a unidirectional electric field on the alternating field of the space-resonant device. By adjusting the strength of the battery 35, it is possible to adjust the time of flight of the electrons through the evacuated chamber 76 and also to adjust the relative time spent by the electrons in the vicinity of the grid 31 to the time spent by the electrons in the vicinity of the grid 32. It is also possible to adjust the flight time of the electrons in the chamber 76 by means of the battery 21 exactly as described in connection with Fig. 2A, without any change in the relative time spent by the electrons near the grid 31 compared to that spent by the electrons near the grid 32. By independent adjustment of batteries 21 and 35, therefore, it is possible to obtain a desired flight time, and also a desired time spent by the electrons in the vicinity of the grid 31 to that spent by the electrons in the vicinity of the grid 32. Provision for transferring energy into or out of the system is illustrated as made with the coupling loop 36. The system can radiate through the hole 37 when this hole is provided. The operation of the arrangement shown in Figure 5 follows the theory already presented. In series with the battery 21 there is shown a source of alternating voltage 38 which when operating superimposes an alternating voltage on the direct accelerating voltage for modulating purposes. This alternating voltage may be used to change the adjustment indicated by Fig. 3D in which the bunched electrons can be caused to reach grid 32 either when at minimum velocity or maximum velocity, as before described. This is useful in super-regenerative arrangements. By this method the oscillations of the system can be alternately started and stopped. In shifting to the adjustment in which the electrons reaching grid 32 are at high velocity the oscillations are stopped quickly because energy is taken from the circuit by the electron beam. This is equivalent to a large suddenly applied load for stopping oscillation, a feature which is not available in other types of oscillators.

Figure 6A:
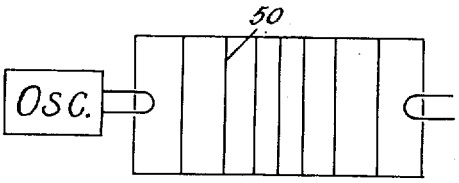
Figs. 6A, 6B, 6C and 6D are alternative forms of our invention.

Alternative forms of our invention are shown in Figures 6A, 6B, 6C, 6D, 7A, 7B and 7C. Figure 6A shows the development of a right circular cylinder into a form suitable for our invention. In the diagrams lines have been drawn to indicate qualitatively the electric lines of force. In Fig. 6A, the lines of electric force 50 of the electromagnetic field are shown parallel to the axis of the cylinder. Thus the field may be said to be symmetrical in space. In other figures, however, the space-resonant device is shown non-symmetrical about a plane between the grids 24 and 25 perpendicular to the axis of the electric field to render the electric field component of the electromagnetic field substantially stronger at the grid 25 than at the grid 24.

Figure 6B:
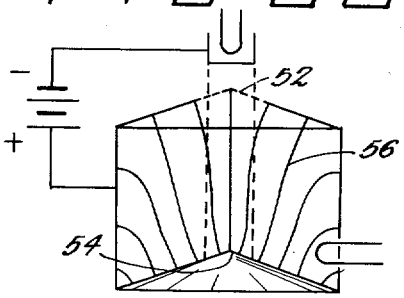

Fig. 6B is derived from Fig. 6A by making the top of the cylinder convex at 52 and the bottom concave at 54, as viewed from the outside. The resulting lines of force 56 converge from the convex top 52 toward the concave bottom 54. The spacing between the lines of force 56 at a particular point is inversely proportional to the strength of the electric field at that point. The spacing between the lines of force at the convex upper end 52 is greater than the spacing between the lines of force at the concave bottom end 54. The electric field strength of the electromagnetic field is therefore less at the convex end 52 than at the concave end 54.

Figure 6C:
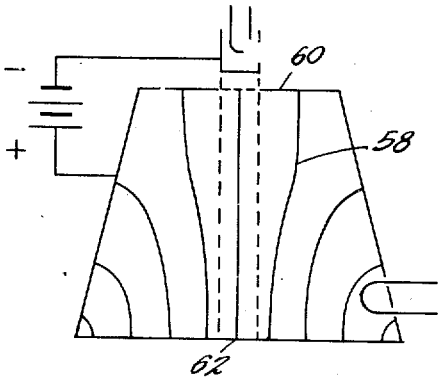

Fig. 6C is derived from Fig. 6A by increasing or decreasing the diameter of one of the ends. The lines of force 58 are therefore of a nature similar to the lines of force 56 of Fig. 6B. The strength of the field at the smaller end 60 is smaller than the strength of the field at the larger end 62.

Figure 6D:
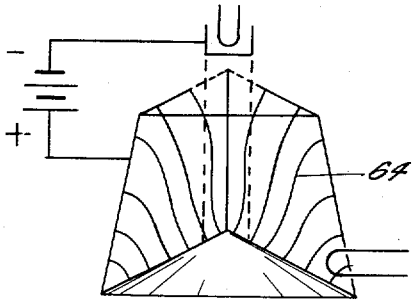

Fig. 6D is derived by combining the modifications of Figs. 6B and 6C. The corresponding lines of force 64 diverge a little more strongly than the lines of force 56 and 58. These arrangements of Figs. 6B, 6C and 6D increase the field intensity at one end relative to the intensity at the other over what is obtained with the cylindrical arrangement of Fig. 6A. This is desirable for practical purposes although our invention will operate with a right cylindrical space-resonant device with flat ends, as in Fig. 6A. For practical operation we have computed that this form will operate with an electron beam voltage of 100,000 if the ratio of the height of the cylinder to its diameter is about one to three. This form has the disadvantage of requiring a comparatively large electron current for operation.

Figure 7A:
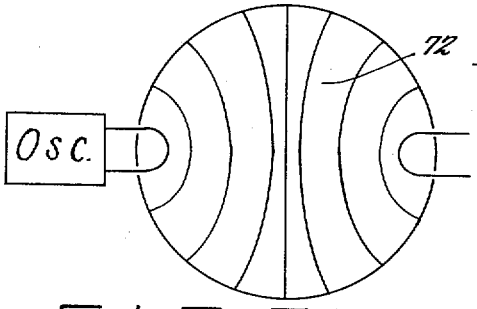
Figs. 7A, 7B and 7C are other alternative forms.
Figure 7C:
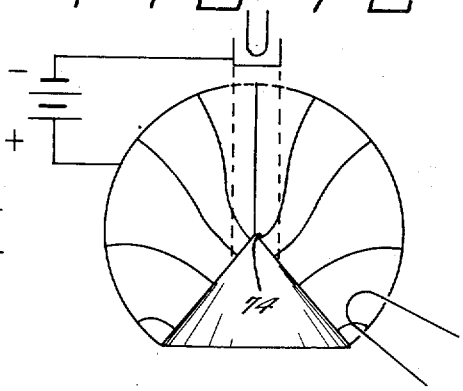
Figure 7B:
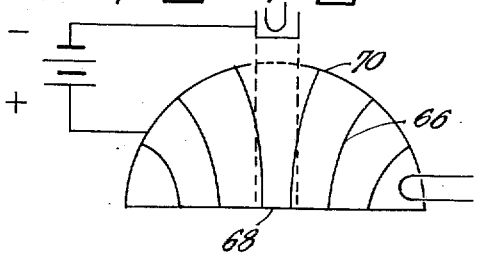

A sphere as shown in Fig. 7A can be used in our invention but it requires such high voltages and currents for operation and the efficiency is so low that it is not considered a practical form. The hemisphere shown in Figure 7B is a practical form operating with voltages at 40,000 and currents as low as about 50 milliamperes. This is because the lines of electric force 66 of Fig. 7B are considerably closer together at the plane boundary 68 than at the spherical boundary 70. This advantage is not obtained with the lines of force 72 of Fig. 7A. The sphere deformed as shown in Fig. 7C with sharp internal projection 74 gives a good field intensity but the use of a point is undesirable because of the small area presented to the electron beam. Rounding the point to get more area for the beam reduces the field intensity so much that the arrangement is not very desirable.

Figure 8 shows an embodiment of our invention possessing advantages of extreme simplicity. In it an oscillating circuit is provided by two circular surfaces 41 and 42 and a conical connecting surface 43. In this surface preferably where surface 41 is connected to it there is an annular insulated capacitive joint 44, across which is applied a direct current potential difference supplied by a battery 45. The battery 45 serves the same function as the batteries 35 and 41 of Fig. 5. Attached to the inner face of surface 41 there is an emitting surface 46 which is heated by a filament 47. The emitter 46 is supported on the surface 41 so there is no important difference of potential between surface 41 and surface 46, but so that heat is not readily conducted from emitter 46 to the cold surface 41. Inside the circuit there is shown a coupling loop 48 for taking out energy.

The operation of this embodiment is basically as has been described before, but in this arrangement the discontinuity of field where the electrons enter it is at the surface of the emitter instead of at a grid. The direct current field is completely superimposed on the alternating current field of the system. The electrons are stopped at the discontinuity existing in the field where it is bounded by the surface 42. By making the joint 44 airtight the structure can be entirely self contained and evacuated.

The geometrical forms we disclose here are illustrative of some that can be used for the practice of our invention. In general, almost any shape of hollow conducting body can be made to oscillate by the methods we have described. However, in practice, shapes will ordinarily be restricted to those simple forms that can be conveniently manufactured and which give the desired shape to the contained electromagnetic field. The design of the forms is subject to the application of well known electromagnetic theory augmented by the mathematical development we have presented.

The application of the present invention to uses as an amplifier, detector, oscillator, or in other ways can be accomplished with reference to the above-mentioned patents and copending applications which show in detail how to apply the klystron for these purposes. In general anything that can be done with the electron beam leaving a klystron can be done with the electron beam where it leaves the second grid of the monotron. It is not to be expected that the monotron will displace the klystron in all applications. Each has certain advantages that will be apparent to those skilled in the art. The simplicity of the monotron recommends it particularly for applications where the flexibility of the klystron is not needed, as in some types of oscillators.

Having described our invention what we claim is:

1. The method of exciting a resonant circuit having an enclosed electromagnetic field, which consists of causing a stream of electrons to enter a region substantially enclosed and containing the oscillating electromagnetic field of said circuit and to pass through it, causing the electrons to be subjected to alternate increases and decreases of speed in the direction of travel thereof while in said region, and causing them to leave said region with less energy than they had when they entered it, *said field having a predetermined electromagnetic field intensity at the location where said electrons first enter the influence of said field, and having a stronger field intensity where said electrons leave the influence of said field*, thus sustaining oscillation of the circuit.

[2. The method of exciting a resonant circuit which consists of causing a stream of electrons to enter the oscillating electromagnetic field of said circuit in a region that is substantially enclosed, causing the electrons to be subjected to alternate increases and decreases of speed in the direction of travel thereof in the field, and causing them to leave the field with less energy, in the aggregate, than they had when they entered it, thus delivering energy to the electromagnetic field and sustaining oscillation of the circuit.]

[3. The method of exciting a resonant circuit which consists of causing a stream of electrons to enter a region of standing electromagnetic waves that is substantially enclosed through a field discontinuity at the boundary of said region, causing the electrons while in said region to interact with the field of the circuit to alternately increase and decrease the speeds of the electrons in the direction of travel thereof, and causing the electrons to leave the region through another field discontinuity with reduced energy, thus delivering energy to the electromagnetic field and sustaining the oscillation of the circuit.]

4. The method of absorbing energy from a resonant circuit which consists of causing electrons to enter a field of standing electromagnetic waves that is substantially enclosed through a field discontinuity at the boundary thereof, causing the electrons while in said field to interact with the same and causing the electrons to leave the field through a field discontinuity at times when their energy is greater than the initial energy.

5. An electromagnetic oscillator comprising a hollow member providing a chamber having conducting inner wall surfaces and adapted for containing a resonant oscillating electromagnetic field of predetermined orientation, and having a frequency of oscillation determined by the dimensions of said chamber, means for projecting a stream of electrons substantially lineally through the chamber for establishing and maintaining said field, said member being of different proportions at the places where the electron stream enters the field and where it leaves the field to render the field at the first-named place less intense than the field at the second-named place.

6. An electromagnetic oscillator comprising a section of an approximately spherical shell, a hollow conical member, a section of a smaller sphere placed inside the shell and connected with the shell by said conical member, the shell, the smaller sphere section, and conical member together forming a resonant chamber, said shell having a grid for admitting electrons into the chamber at predetermined orientation for producing therein the oscillating electromagnetic field.

7. Apparatus of the character described comprising, cavity resonator means, means for creating an electron stream for passage lineally through said cavity resonator means to thereby set up a standing electromagnetic field therewithin, said cavity resonator means being of predetermined variable cross-section at different points along the axis of the stream so that the electric component of said field is stronger at the point where the electron stream leaves said cavity resonator means than it is at the point of entry of the electrons thereinto.

8. A closed resonant circuit consisting of a conducting hollow substantially frusto-conical member providing a chamber, one wall of which chamber is apertured and concave toward the enclosed space, the opposite wall of which chamber is also apertured and convex toward the enclosed space, and means for directing a stream of electrons through said chamber via said apertured walls.

9. A resonant circuit comprising a conducting shell of approximately spherical form with a reentrant part presenting an approximately spherical surface within the shell, the shell and reentrant part together forming an electrically closed boundary for a contained electromagnetic field.

[10. The method of producing electromagnetic oscillations in a hollow conducting member, comprising projecting a stream of electrons into said hollow conducting member, sinusoidally altering the velocity of the electrons in the direction of travel thereof in said member by an electromagnetic field resonant in said member, whereby traveling electron groups are formed within said member, causing said groups to be alternately accelerated and decelerated by said electromagnetic field, and thereafter quickly removing said traveling electron groups from said field when they have been decelerated to a minimum velocity.]

11. A method of controlling an electron stream that comprises causing electrons of the stream to enter a confined oscillating electromagnetic field and thereafter to travel in the field to cause the electrons thereafter to gain energy from and lose energy to the field, and causing the electrons to leave the field at times when the field has gained energy on the whole from the electrons, *said field having a predetermined electromagnetic field intensity at the location where said electrons first enter the influence of said field, and having a stronger field intensity where said electrons leave the influence of said field.*

12. A method of controlling an electron stream that comprises establishing a resonant electromagnetic field having boundaries of different field intensities, and causing electrons of the stream to enter the field through the boundary of lesser field intensity, to travel through the field, and to leave the field through the boundary of greater field intensity.

[13. A method of controlling an electron stream during its passage through an oscillating electromagnetic field having standing electromagnetic waves contained in an internally resonant conducting hollow body that comprises causing electrons of the stream to assume periodically varying velocities in a predetermined region of the field, and causing the electrons thereafter to travel in the field beyond the said region to produce interaction at the resonant frequency of the field between the electrons of the stream and the field to cause the electrons of the stream, as they pass through the field, to become concentrated in groups in a second predetermined region of the field.]

[14. A method of controlling an electron stream during its passage through an oscillating electromagnetic field having standing electromagnetic waves contained in an internally resonant conducting hollow body that comprises imparting to the electrons of the stream in a predetermined region of the field increments and decrements of energy of the period of the field to cause the electrons of the stream to assume periodically varying velocities, and causing the electrons thereafter to travel in the field beyond the said region to produce interaction at the resonant frequency of the field between the electrons of the stream and the field to cause the electrons of the stream, as they pass through the field, to become concentrated in groups in a second predetermined region of the field.]

[15. A method of controlling an electron stream during its passage through an oscillating electromagnetic field having standing electromagnetic waves contained in an internally resonant conducting hollow body that comprises imparting to the electrons of the stream in a predetermined region of the field increments and decrements of energy of the period of the field to cause the electrons of the stream to assume periodically varying velocities, causing the electrons thereafter to travel in the field beyond the said region to produce interaction at the resonant frequency of the field between the electrons of the stream and the field to cause the electrons of the stream, as they pass through the field, to become concentrated in groups in a second predetermined region of the field, and imparting to the electrons individually in the second region greater increments and decrements than in the first-named predetermined region, with the decrements exceeding the increments.]

[16. A method of controlling an electron stream during its passage through an oscillating electromagnetic field having standing electromagnetic waves contained in an internally resonant conducting hollow body, the said hollow body containing also a substantial magnetic field component, the said method comprising causing electrons of the stream to assume periodically varying velocities in a predetermined region of the field, and causing the electrons thereafter to travel in the field beyond the said region to produce interaction at the resonant frequency of the field between the electrons of the stream and the field to cause the electrons of the stream, as they pass through the field, to become concentrated in groups in a second predetermined region of the field.]

[17. A method of controlling an electron stream during its passage through an oscillating electromagnetic field having standing electromagnetic waves contained in an internally resonant conducting hollow body that comprises passing an electron stream having a substantially uniform distribution in time from outside the body into and through the field, and regulating the time of flight of the stream in the field to produce interaction at the resonant frequency of the field between the electrodes of the stream and the field to cause the electrons of the stream, during their travel through the field, to deliver energy to the field at the resonant frequency of the field thereby to excite and maintain electromagnetic resonance in the field at the resonant frequency of the field.]

[18. A method of exciting a resonant circuit having an electromagnetic field in a substantially enclosed region that comprises causing a stream of electrons to enter into and to travel in the region, increasing and decreasing the speed of the electrons in the direction of travel thereof during their travel in the region, and causing the electrons to leave the region with less energy than they had when they entered it, thus sustaining oscillation of the circuit.]

[19. Apparatus for generating alternating-current energy having, in combination, a space-resonant device having a bounding surface, means for passing an electron stream through a portion of the bounding surface into the space-resonant device, said device being of such proportions and the electrons of said stream having such velocities that a resonant oscillating electric field is established in the space-resonant device to cause the electrons to assume in a predetermined region of the field near the said portion of the bounding surface periodically varying speeds of the frequency of the field, in the direction of travel of the electrons, thereby to cause the electrons to become concentrated in groups during their further travel in the field, and to cause the electron groups to leave the field at another portion of the bounding surface to cause the electrons of the groups to transfer energy to the field to sustain it in oscillation, and a conductor coupled to the field.]

[20. Apparatus of the character described having, in combination, a space-resonant device, and means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the field to abstract energy from the electron stream.]

[21. Apparatus of the character described having, in combination, a space-resonant device, and means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field.]

[22. Apparatus of the character described having, in combination, a space-resonant device, means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, and means for extracting energy from the field.]

[23. Apparatus of the character described having, in combination, a space-resonant device having a bounding surface, and means for passing an electron stream through a portion of the bounding surface into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume in a predetermined region of the field near the said bounding surface periodically varying velocities having the frequency of the field as a function of the time of entry into the space-resonant device, secondly, to cause the faster electrons to gain upon the slower electrons to cause the electrons to become concentrated in groups during their further travel in the field, and thirdly, to cause the groups to leave the field at another portion of the bounding surface with less energy than when the electrons entered the field, thereby to transfer energy to the field.]

[24. Apparatus of the character described having, in combination, a space-resonant device having an apertured wall, and means for passing an electron stream into the space-resonant device through the apertured wall to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field.]

[25. Apparatus of the character described having, in combination, a space-resonant device having an apertured wall, and means for passing an electron stream into the space-resonant device to establish an oscillating resonant electromagnetic field in the space-resonant device and then out of the field through the apertured wall, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field through the apertured wall with less energy than when the electrons entered the field, thereby to transfer energy to the field.]

[26. Apparatus of the character described having, in combination, a space-resonant device, means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume perodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field, and means for superimposing a non-oscillating electric field upon the electromagnetic field in the space-resonant device.]

[27. Apparatus of the character described having, in combination, a space-resonant device, means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field, and means for superimposing upon the electromagnetic field in the space-resonant device a field of frequency different from the frequency of the electromagnetic field.]

[28. Apparatus of the character described having, in combination, a space-resonant device having an inner evacuated portion and a surrounding non-evacuated portion separated by a dielectric boundary, and means for passing an electron stream into and through the evacuated portion of the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field.]

29. A closed resonant circuit comprising a conducting hollow substantially frusto-conical chamber having an apertured end wall, and means for directing a stream of electrons into the chamber through the apertured end wall.

30. A closed resonant circuit comprising a conducting hollow substantially frusto-conical chamber the small end wall of which is apertured, and means for directing a stream of electrons into the chamber through the apertured end wall.

31. Means for converting the kinetic energy of electrons in an electron stream into high frequency electromagnetic energy comprising a hollow conducting member having two perpendicular axes and being non-symmetrical with respect to one of said axes, whereby the electric component of an electromagnetic field resonant therein converges toward one portion of the inner wall thereof and diverges therefrom toward an opposite portion of the said wall, and means for projecting a stream of electrons through said hollow conducting member from said opposite wall portion substantially along the other of said axes to the wall portion toward which said component converges.

WILLIAM W. HANSEN.
RUSSELL H. VARIAN.

No references cited.